United States Patent [19]

Seibel et al.

[11] 4,012,174
[45] Mar. 15, 1977

[54] FUEL PRIMING PUMP

[75] Inventors: Jack N. Seibel; Ronald C. Stump, both of Peoria, Ill.

[73] Assignee: Caterpillar Tractor Co., Peoria, Ill.

[22] Filed: Oct. 20, 1975

[21] Appl. No.: 623,856

[52] U.S. Cl. .............................. 417/307; 417/437; 417/458; 417/489

[51] Int. Cl.² ................... F04B 49/00; F04B 21/02

[58] Field of Search .......... 417/437, 307, 456–458, 417/489, 571, 274, 380; 92/85 B, 60.5

[56] References Cited

UNITED STATES PATENTS

| 805,981 | 11/1905 | Mitchell | 417/380 |
|---|---|---|---|
| 1,001,132 | 8/1911 | Frey | 417/380 |
| 1,365,824 | 1/1921 | Goldberg | 417/571 |
| 2,012,721 | 8/1935 | Johnson | 417/557 |
| 2,235,797 | 3/1941 | Carlson | 417/443 |
| 3,023,936 | 3/1962 | Marsh et al. | 417/489 |
| 3,259,308 | 7/1966 | Bennett | 417/458 |
| 3,605,553 | 9/1971 | Danigati | 92/65 B |
| 3,680,985 | 8/1972 | Ginsberg | 92/60.5 |
| 3,803,988 | 4/1974 | Orr | 417/571 |
| 3,805,672 | 4/1974 | Pekrul | 92/85 B |

FOREIGN PATENTS OR APPLICATIONS

| 520,396 | 3/1955 | Italy | 417/571 |

*Primary Examiner*—William L. Freeh
*Attorney, Agent, or Firm*—Phillips, Moore, Weissenberger, Lempio & Majestic

[57] ABSTRACT

The invention is concerned with an improvement in a manually activated fuel priming pump for an internal combustion engine comprising a housing having a barrel communicating at its lower end with a flange disposed transversely to the barrel. A plunger communicates at its upper end with a handle, the plunger being reciprocally mounted in a chamber of the barrel to selectively pump fuel from a first to a second valve located in the flange of the housing. The plunger has around the periphery thereof means slidingly sealing it with low friction against a bore defining the chamber. The improvement of the invention comprises a member co-axial with the plunger and extending therefrom towards the flange and member-bore seal means slidably sealing said member to said bore and disposed to allow flow of said fuel from a space within said chamber between said plunger and said flange to said second valve and to retard flow of said fuel in a reverse direction.

14 Claims, 6 Drawing Figures

FUEL PRIMING PUMP

BACKGROUND OF THE INVENTION

1. Field of the Invention

The invention is concerned with fuel priming pumps for internal combustion engines. Such fuel priming pumps are normally associated with check valves mounted in external hardware such as an adapting bracket or the like. Such pumps give rise to installation, servicing and related problems due to their somewhat complex construction. In addition, a number of conventional priming pumps are prone to leakage and exhibit an inability to be worked easily. The present invention is most particularly concerned with an improvement in a fuel priming pump which assures that the fuel being pumped cannot pass around the plunger which pumps it and thereby wet the hand of the person doing the pumping thereby presenting a serious safety problem.

2. Prior Art

Fuel priming pumps are of course well known to the prior art. One particularly useful pump in this regard is disclosed in U.S. Pat. No. 3,669,576. The pump disclosed in this patent has a plunger which is screw-threadable to a flange which fits over external hardware, with check valves being included in the flange. The pump of this patent further discloses a particular low friction seal between the periphery of the plunger and the inside of a barrel within which the plunger reciprocates. U.S. Pat. No. 3,500,759 discloses yet another fuel priming pump. This pump when not in use is fastened with its piston reciprocated into its barrel via a pivoted spring lock arrangement.

With the prior art fuel priming pumps a particular problem exists, namely the problem of fuel escape around the plunger and up into the barrel of the pump above the plunger. This problem arises due to fuel at high applied pressure which may be trapped in the chamber between the plunger and the inlet and outlet check valves. In particular, after the pump has been used the plunger must be slid downwardly and secured to the base. In doing so, the pressure of fuel normally filling or flowing through the chambers below the plunger is substantially increased by downward movement of the plunger. Such increased pressure can result in leakage past the plunger seal means and it eventually enters the upper dry chamber. From the upper chamber pumping action tends to detrimentally expel the fuel past the handle of the pump. Also, when the plunger is fastened in its innerwardly reciprocated position fuel is trapped between the bottom of the plunger and the flange thus creating a hydraulic lock which again focres fuel to escape past the plunger itself and up into the barrel above the plunger. When this happens, fuel trapped between the plunger and the chamber formed by the barrel portion of the pump squirts out when the pump handle is pulled up preparatory to using the pump again. The amount of fuel leaked out, while small, is sufficient to wet an individual's hand, damage clothing and the like and create potential fire hazards.

It is thus highly desirable to provide an improvement in fuel priming pumps which solves the problem of fuel escaping about the plunger and collecting in the chamber between the plunger and the handle of the pump thereby creating fire hazards. The provision of a positive acting, yet quick to engage and disengage system for locking the plunger within the barrel reciprocated towards the check valves therein would likewise be desirable so that the pump could readily be used and/or locked in place. The present invention is concerned with a unique and unobvious solution to the above set out problems.

SUMMARY OF THE INVENTION

The invention is concerned with an improvement in a manually activated fuel priming pump for an internal combustion engine. Such a fuel priming pump comprises a housing having a barrel communicating at a first end thereof with a flange dispersed transversely to the barrel. The pump includes a plunger communicating with a handle adjacent a second end of the barrel, the plunger being reciprocally mounted in a chamber of the barrel to selectively pump fuel from a first to a second valve located in the flange of the housing. The plunger has therearound means slidably sealing it with low friction against the bore defining the chamber. The improvement of the invention comprises a member co-axial with the plunger and extending therefrom towards the flange and member-bore seal means slidably sealing said member to said bore and disposed to allow flow of said fluid from a space within said chamber between said plunger and said flange to said second valve and to retard flow of said fuel in a reverse direction.

BRIEF DESCRIPTION OF THE DRAWINGS

The invention will be better understood by reference to the drawings in the figures of which like numbers denote like parts throughout and wherein.

DESCRIPTION OF THE PREFERRED EMBODIMENTS

Figure 1:
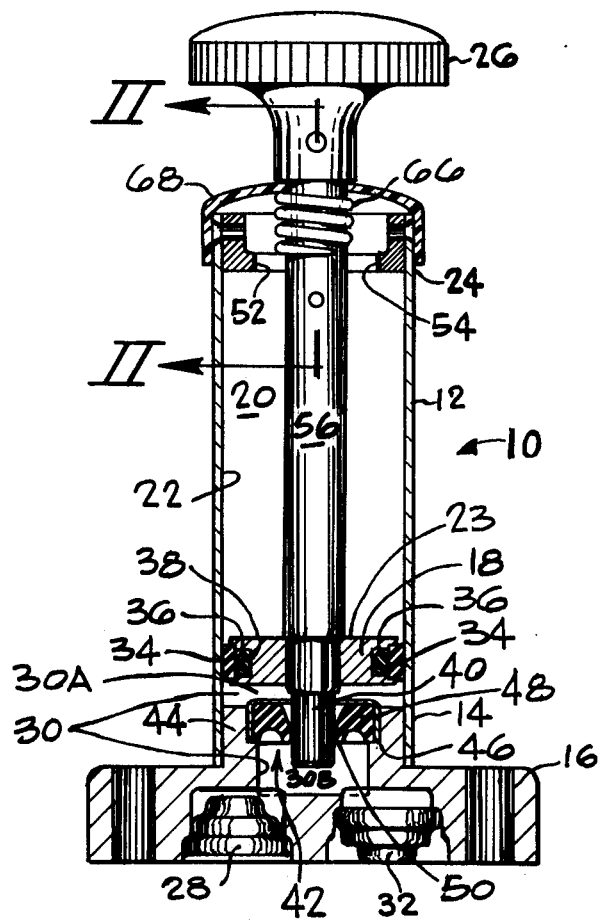
FIG. 1 illustrates in side elevational section one embodiment of the improved fuel priming pump of the present invention.

Referring first to FIG. 1, there is illustrated a preferred embodiment of the invention in the form of a fuel priming pump 10, which is preferably of unitized construction and comprises a housing having a barrel 12 which communicated at a first (lower) end 14 thereof with a flange 16 which is disposed transversely to said barrel 12. A plunger 18 is adapted to move reciprocatingly within a chamber 20 defined by a bore 22 within the barrel 12. An upper end 23 of the plunger 18 communicates adjacent a second (upper) end 24 of the barrel 12 with a handle 26. The plunger 18 is adapted to reciprocate as the handle 26 is moved reciprocally to selectively pump fuel from a first one-way valve 28 which leads into a space 30 between the plunger 18 and the flange 16 and therefrom out of a second one-way valve 32 as said plunger 18 is reciprocated towards said flange 16. The plunger 18 includes means slidingly sealing it with low friction against the bore 22. The preferred sliding sealing means comprises an annular ring 34 backed by an O-ring 36 which urges said annular ring 34 into intimate contact with the bore 22. The annular ring 34 and the O-ring 36 are generally included within a groove 38 annularly formed around the plunger 18. The annular ring 34 can be of any suitable low friction material such as for example Teflon (a trademark of E. I. Dupont de Nemour & Co., Wilmington, Del.) or the like.

In accordance with the present invention, a member co-axial with the plunger 18 and extending therefrom towards the flange 16 is provided. This member in the embodiment illustrated in FIGS. 1–3 comprises a rod 40. Also in accordance with the present invention a member-bore seal means, in the embodiment illustrated in FIG. 1 a lip seal 42 supported by a sleeve 44 which extends from the flange 16 towards the handle 26 within the barrel 12 in tight sealing relation with the bore 22 thereof supports the lip seal 42. The lip seal 42 is generally conventional in nature and includes a metallic back-up member 46 which supports a resilient, generally plastic or rubber sealing member 48 with the metallic back-up member 46 being itself sealingly attached to the sleeve 44. The resilient sealing member 48 seals against the rod 40 at a lip portion 50 of said resilient sealing member 48 and is disposed to allow flow of fuel, when the plunger 18 is reciprocated towards the flange 16 sufficiently to seal the rod 40 at the lip portion 50 from a top portion 30A of the space 30 to a bottom portion 30B of the space 30 to the second one-way valve 32 and therethrough and to retard flow of said fuel in a reverse direction past said lip portion 50 of said lip seal 42 and thence past said plunger 18. In this manner, fuel entrapped in the top portion 30A of the space 30 finds an easy path downwardly to the bottom portion 30B of the space 30 and thus proceeds there rather than leaking up about the annular ring 34 and into the chamber 20 between the plunger 18 and the handle 26. The rod 40 is generally circular in cross section and of smaller diameter than the plunger 18 for easy motion within the barrel 12.

Figure 2:
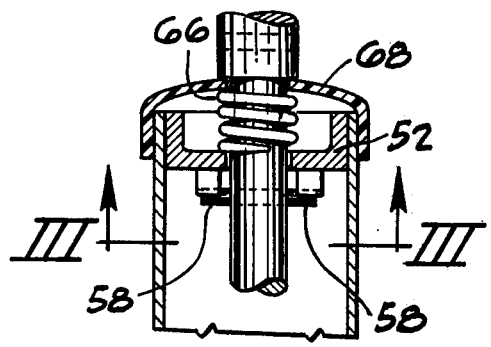
FIG. 2 illustrates a view taken along the line II—II of FIG. 1.
Figure 3:
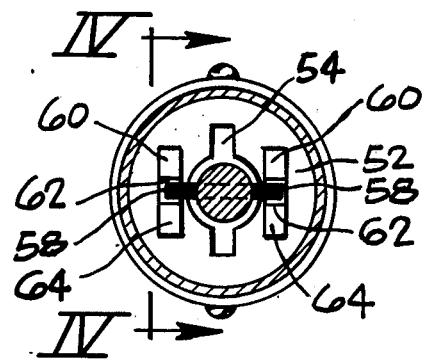
FIG. 3 illustrates a view taken along the line III—III of FIG. 2.
Figure 4:
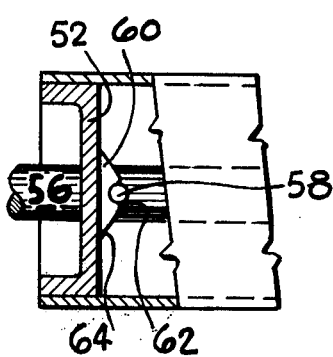
FIG. 4 illustrates a view taken along the line IV—IV of FIG. 3.

Referring now most particularly to FIGS. 2, 3 and 4, there is illustrated means for locking the plunger 18 in position when reciprocated towards said flange 16. A disc 52 is provided having a central opening 54 therethrough, said disc 52 extending inwardly from the bore 22 adjacent the handle 26 and more particularly adjacent the second upward end 24 of the barrel 12. The plunger 18 communicates with the handle 26 via an extension rod 56 of said rod 40, said extension rod 56 generally being integral with said rod 40. The extension rod 56 extends from the plunger 18 to the handle 26 and passes slidingly through the opening 54.

As is illustrated most clearly in FIGS. 2, 3 and 4 means are also provided for securing the extension rod 56 to the disc 52. In the embodiment illustrated the securing means comprises a pair of tabs 58 (although any number of tabs can also be used) extending radially outwardly from the extension rod 56 adjacent the handle 26. A pair of detents 60 (although as with the tabs any number can be used) is generally provided extending inwardly radially into the chamber 20, the tab 58 being adapted to fit against a flange facing recess 62 of the detent 60 in at least one rotational position of the extension rod 56 relative to the disc 52. The securing means is generally a ramp type securing lock which includes not only the detent 60 but generally a ramp 64 leading thereto. The extension rod 56 and with it the plunger 18 and the rod 40 are rotatably mounted, as will be apparent, so that the entire assembly can be rotated relative to the barrel 12 by simply twisting the handle 26. Biasing means, in the embodiment illustrated in FIGS. 1–4, a spring 66 are provided for biasing the handle 26 away from the disc 52 sufficiently to forcibly abut the tab 58 against the flange facing recess 62 of the detent 60. In the embodiment illustrated in FIGS. 1–4, there is included a cap 68 which is mounted to the extension rod 56 adjacent the handle 26, said cap 68 extending outwardly from the extension rod 56 over the barrel 12 intermediate the disc 52 and the handle 26 and the spring 66 serves to bias the cap 68 away from the disc 52.

Figure 5:
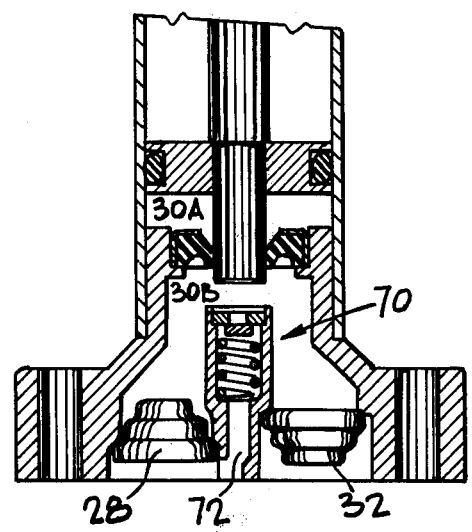
FIG. 5 illustrates in partial view an embodiment as in FIG. 1 which includes a pressure relief by-pass valve.

Referring now most particularly to FIG. 5, there is illustrated an embodiment of the invention as described above which further includes by-pass valve means, in the embodiment illustrated the by-pass valve 70, which communicates from the bottom portion 30B of the space 30 via a passage 72 to upstream flow-wise of said first one-way valve 28. The by-pass valve is biased to open responsive to a selectable pressure being applied thereby by reciprocation of the plunger 18 towards the flange 16 thus preventing excessively high pressure from being forced through the second one-way valve 32 and into the internal combustion engine to which the flange 16 is mounted.

ALTERNATE EMBODIMENT

Figure 6:
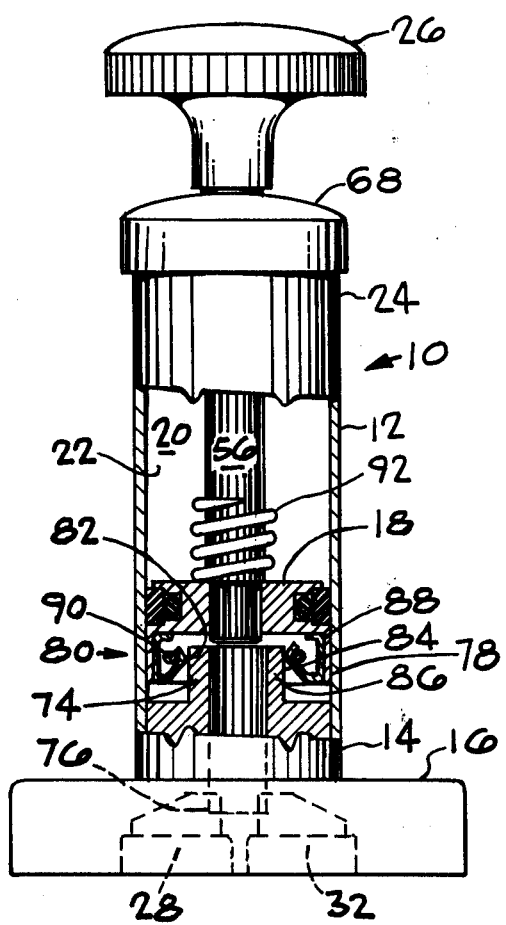
FIG. 6 illustrates in side elevational section an alternative embodiment of the present invention.

Referring now most particularly to FIG. 6, there is illustrated an alternate embodiment of the present invention. In the embodiment illustrated in FIG. 6, the fuel priming pump 10 again includes a barrel 12 which has attached at a first lower end 14 thereof a flange 16. A plunger 18 reciprocates within a chamber 20 formed by the bore 22. Adjacent a second upper end 24 of the barrel 12 is a handle 26, reciprocating motion of which gives a reciprocating motion to the plunger 18. A first one-way valve 28 and a second one-way valve 32 operate in the same manner as previously described. A by-pass valve 70 as described above can also form a part of the alternate embodiment.

In the embodiment illustrated in FIG. 6, a tube 74 extends from and is integral with the flange 16, a first end 76 of the tube 74 is in flow communication with the first valve 28 and the second valve 32 and extends therefrom centrally within the bore 22. The co-axial member in this embodiment which extends from the plunger 18 towards the flange 16 comprises a ring 78 extending from the periphery of the plunger 18 towards the flange 16. In the embodiment of FIG. 6, the member-bore seal means comprises a ring-bore seal means 80 which extends radially inwardly from and is supported by the ring 78 and which slidingly fits at its lip 82 against the exterior 84 of the tube 74 adjacent a second end 86 of said tube 74. The lip 82 is a part of a resilient metallic spring 88 which is supported by the ring 78. The lip 82 of the metallic spring 88 is biased against the exterior 84 of the tube 74. A garter spring 90 serves to insure a resiliently tight but sliding fit between the lip 82 and the exterior 84 of the tube 74.

The handle 26, cap 68, extension rod 56, etc. operate as explained above with respect to FIGS. 1–4. In the embodiment illustrated in FIG. 6, a stopping spring 92 is provided about the extension rod 56 intermediate the plunger 18 and the disc 52. The stopping spring 92 contacts the flange facing side of the disc 52 as the plunger 18 is retracted from the flange 16 by pulling upwardly upon the handle 26. Thus the stopping spring 92 serves to stop jamming of the plunger 18 against the flange facing side of the disc 52. A stopping spring 92 can also be used in the embodiment illustrated in FIGS. 1–5.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. In a manually activated fuel priming pump for an internal combustion engine comprising a housing having a barrel communicating at a first end thereof with a flange disposed transversely to the barrel, a plunger communicating with a handle adjacent said first end of said barrel, said plunger being mounted for reciprocal motion in a chamber of said barrel to selectively pump fuel from a first valve into said chamber below said plunger on retraction thereof and from said chamber out of a second valve on advancing of said plunger, said first and second valves being located in the flange of the housing, a plunger having therearound means slidingly sealing it with low friction against a bore defining said chamber, an improvement which comprises:

a member co-axial with said plunger and extending therefrom towards said flange; and member-bore seal means slidably sealing said member to said bore and disposed intermediate said first and second valves and said plunger to allow flow of said fuel from said chamber below said plunger to said second valve and to sealingly retard flow of said fuel past said seal means in a reverse direction.

2. An improvement as in claim 1, wherein said member-bore seal means slidably sealing said member to said bore defines a space between said plunger and said flange, said space being separated by said seal means into a first portion intermediate said plunger and said seal means and a second portion intermediate said seal means and said first and second valves.

3. An improvement as in claim 1, wherein said member comprises a circular cross section rod of smaller diameter than said plunger and said member-bore seal means comprises a rod-bore seal means in the form of a lip seal.

4. An improvement as in claim 3, wherein said lip seal is supported by a sleeve extending from said flange towards said handle within said barrel in tight sealing relation with said bore.

5. An improvement as in claim 4, wherein said plunger communicated with said handle via an extension rod of said rod which extends from said plunger to said handle; and including a disc extending inwardly from said bore adjacent said handle having a central opening therethrough; said extension rod slidingly passing through said opening; and means for securing said extension rod to said disc.

6. An improvement as in claim 5, wherein said extension rod is rotatable relative to said disc, said securing means comprises a tab extending radially outwardly from said extension rod adjacent said handle and including: a detent extending inwardly radially into said opening, said tab being adapted to fit against a flange facing recess of said detent in at least one rotational position of said extension rod relative to said disc; and biasing means for biasing said handle away from said disc sufficiently to forcibly abut said tab against said flange facing recess of said detent.

7. An improvement as in claim 6, including a cap extending outwardly from said extension over said barrel intermediate said disc and said handle and wherein said biasing means comprises a spring biased between said disc and said cap.

8. An improvement as in claim 5, including by-pass valve means communicating from a portion of said housing intermediate said rod-bore seal and said first and second valves to upstream flow-wise of said first valve, said by-pass valve being biased to open responsive to a selectable pressure being applied thereto by reciprocation of said plunger towards said flange.

9. An improvement as in claim 8, wherein said extension rod is rotatable relative to said disc, said securing means comprises a tab extending radially outwardly from said extension rod adjacent said handle, and including: a detent extending inwardly radially into said opening, said tab being adapted to fit against a flange facing recess of said detent in at least one rotational position of said extension rod relative to said disc; and biasing means for biasing said handle away from said disc sufficiently to forcibly abut said tab against said flange facing recess of said detent.

10. An improvement as in claim 9, including a cap extending outwardly from said extension rod over said barrel intermediate said disc and said handle and said biasing means comprises a spring biased between said disc and said cap 11. An improvement as in claim 1, including a tube, a first end of which is in flow communication with said first and second valves and which extends therefrom centrally within said bore and towards said handle, wherein said member comprises a ring extending from the periphery of said plunger towards said flange, said member-bore seal means comprises a ring-bore seal means which extends radially inwardly from and is supported by said ring and which slidingly fits against the exterior of said tube adjacent a second end thereof.

12. An improvement as in claim 11, including a disc extending inwardly from said bore adjacent said handle having a central opening therethrough; wherein said plunger communicates with said handle via an extension rod which slidingly passes through said opening; and also including means for securing said extension rod to said disc.

13. An improvement as in claim 12, wherein said extension rod is rotatable relative to said disc, said securing means comprises a tab extending radially outwardly from said extension rod adjacent said handle, and including: a detent extending inwardly radially into said opening, said tab being adapted to fit against a flange facing recess of said detent in at least one rotational position of said extension rod relative to said disc; and biasing means for biasing said handle away from said disc sufficiently to forcibly abut said tab against said flange facing recess of said detent.

14. An improvement as in claim 13, including a stopping spring about said extension rod intermediate said plunger and said disc, said stopping spring contacting said disc as said plunger is retracted theretowards.

* * * * *